United States Patent [19]

Morishita et al.

[11] Patent Number: 5,224,337
[45] Date of Patent: Jul. 6, 1993

[54] OPERATING METHOD FOR GAS TURBINE WITH VARIABLE INLET VANES

[75] Inventors: Susumu Morishita; Yoshiaki Miyake; Seishi Uchida, all of Komaki, Japan

[73] Assignee: Mitsubishi Jukogyo Kabushiki Kaisha, Tokyo, Japan

[21] Appl. No.: 700,480

[22] Filed: May 15, 1991

[51] Int. Cl.⁵ ............................................... F02C 9/20
[52] U.S. Cl. ................................... 60/39.03; 60/39.29
[58] Field of Search ................. 60/39.03, 39.27, 39.29, 60/39.511, 269, 39.2, 240

[56] References Cited

U.S. PATENT DOCUMENTS

| | | |
|---|---|---|
| 2,570,847 | 10/1951 | Ovens . |
| 3,795,104 | 3/1974 | McLean .......................... 60/39.27 |
| 3,981,140 | 9/1975 | Lunsford et al. ................ 60/39.03 |

FOREIGN PATENT DOCUMENTS

| | | |
|---|---|---|
| 961673 | 4/1957 | Fed. Rep. of Germany . |
| 2819158 | 11/1978 | Fed. Rep. of Germany . |
| 2085470 | 12/1971 | France . |
| 639619 | 7/1950 | United Kingdom ............... 60/39.29 |
| 762883 | 12/1956 | United Kingdom . |
| 1301615 | 1/1973 | United Kingdom . |
| 1585596 | 3/1981 | United Kingdom . |

Primary Examiner—Louis J. Casaregola
Attorney, Agent, or Firm—McAulay Fisher Nissen Goldberg & Kiel

[57] ABSTRACT

A gas turbine in which a centrifugal compressor which is driven by a high-pressure turbine and a variable inlet guide vane located at the inlet of the centrifugal compressor are provided, but an axial-flow compressor is not provided between the centrifugal compressor and the variable inlet guide vane, and an operating method of a gas turbine in which the output is varied by moving the variable inlet guide vane while keeping the speed of engine rotation at a high level near its rated value. It is possible to vary the output in a short period of time and durability of an engine is improve.

4 Claims, 3 Drawing Sheets

OPERATING METHOD FOR GAS TURBINE WITH VARIABLE INLET VANES

BACKGROUND OF THE INVENTION

1. Field of the Invention

The present invention relates to a gas turbine used as a main engine and an auxiliary engine (APU) for aircraft, vehicles, industrial purposes and so forth, and a thrust gas turbine engine (turbojet, turbofan) used primarily as a main engine for aircraft.

Further, the present invention relates to an operating method of the above-mentioned gas turbine.

2. Description of the Related Art

FIG. 5 is a longitudinal sectional view showing an example of a conventional gas turbine engine. Air suctioned through an air inlet port 1 is compressed by an axial-flow compressor 2 and a centrifugal compressor 3 and led to a combustor 4, where the compressed air is used for combustion of fuel. A high-pressure turbine 5 and an output turbine 6 are driven to rotate by combustion gas produced by combustion. The axial-flow compressor 2 and the centrifugal compressor 3 mentioned above are driven by the rotation of the high-pressure turbine 5. The torque of the output turbine 6 is taken out through an output shaft 7. A numeral 8 denotes a full authority digital electronic control (FADEC) device. Increase and decrease of the output is performed by regulating the supply quantity of fuel so as to vary the speed of engine rotation. In the above-mentioned axial-flow compressor 2, a variable inlet guide vane 9 is provided on an inlet side and a variable stationary vane 10 is provided on an outlet side, respectively, in order to prevent surging, and angles thereof are controlled by means of the FADEC device 8.

Next, FIG. 6 is a longitudinal sectional view showing another example of a conventional gas turbine engine. In this example, a variable turbine nozzle 11 is provided at the inlet of the output turbine 6, and output responsiveness is increased by rapidly moving the variable turbine nozzle 11 by means of the FADEC device 8. Since only the centrifugal compressor 3 is provided as the compressor, and no axial-flow compressor is provided, neither the variable inlet guide vane nor the variable stationary vane is provided.

There have been such problems to be solved in above-mentioned conventional gas turbine engine as follows.

In a gas turbine engine illustrated in FIG. 5, it is required to vary the engine rotation for regulating the output. Accordingly, the output response time is affected by the rotational moment of inertia of a rotor, and there has been a limit for reducing the speed of rotation of the engine. Namely, time is required in order to accelerate and decelerate a rotary body having large inertial mass. Since the variable inlet guide vane 9 and the variable stationary vane 10 are provided to avoid surging, the variable range is narrow and large output variation is not obtainable even if these vanes are moved.

Further, there is such a problem that surging occurs when the variable inlet guide vane 9 and the variable stationary vane 10 are altered to such an extent that output can be varied.

In a gas turbine engine illustrated in FIG. 6, output responsiveness is increased by moving the variable turbine nozzle 11 rapidly and fuel consumption at partial load is also improved further, but there have been problems in reliability, performance and weight because the variable mechanism has to be installed at a high temperature portion. For example, since the variable mechanism is exposed to high temperature, it is required to keep a large clearance between the vane and the wall surface taking thermal expansion into consideration. The loss caused by leakage through the clearance becomes large thus deteriorating the performance.

Further, in a conventional thrust gas turbine engine, the engine rotation is varied by regulating the supply quantity of fuel to alter the output thereof.

When the engine rotation is varied in order to vary the output in a thrust gas turbine engine having no such variable mechanism, there has been a drawback that a certain period of time is required for acceleration and deceleration and high responsiveness cannot be achieved because the rotary body has a large inertial mass.

Further, in some thrust gas turbine engines, a variable nozzle is provided at an inlet of the turbine and the quantity of combustion gas which flows into the turbine is regulated by opening and closing the variable nozzle to alter the engine output.

In a thrust gas turbine engine including a turbine with a variable nozzle, the above-described problems are solved and fuel consumption with partial load is also improved. However, it is required to keep a large clearance between the vane and the wall surface taking thermal expansion into consideration because a variable mechanism has to be installed at a high temperature portion of the engine similarly to the engine illustrated in FIG. 6, thus causing problems in performance, reliability and weight such that leakage loss becomes large and performance deteriorates.

SUMMARY OF THE INVENTION

According to the present invention, there is provided in order to solve above-mentioned conventional problems, a gas turbine characterized in that a centrifugal compressor which is driven by a high-pressure turbine and a variable inlet guide vane located at the inlet of the centrifugal compressor are provided, and an axial-flow compressor is not provided between the centrifugal compressor and the variable inlet guide vane. Namely, a simple air passage connects the high-pressure turbine and the variable inlet guide vane.

Further, according to the present invention, there is provided a thrust gas turbine equipped with a centrifugal compressor which pressurizes air, a combustor for the combustion of fuel using the above-mentioned pressurized air, and turbine which is driven to rotate with a part of energy of the gas produced in the combustor and which drives the centrifugal compressor, characterized in that a variable inlet guide vane is provided at the inlet of the centrifugal compressor.

Furthermore, according to the present invention, there is provided an operating method of a gas turbine, characterized in that the output is varied by driving the variable inlet guide vane while keeping the speed of engine rotation at a high level near its rated value.

Incidentally, "variable inlet guide vane" is a technical term used in fluid machinery and means a stationary vane having no moving vane in front thereof.

According to the present invention, it is possible to reduce the flow rate of air taken into an engine so as to reduce, the brake horse power of the engine even at a high speed of engine rotation by throttling the variable inlet guide vane. When the variable inlet guide vane is opened suddenly, the flow rate increases and the output also increases rapidly. Thus, the output response time of the engine is determined almost by the response time of the variable inlet guide vane. The ambient temperature being close to normal temperature, the variable inlet guide vane of the compressor can be manufactured to be thin in shape and light in weight, and it is possible not only to make the response time very short, but also to deter malfunction.

Namely, in the present invention, the variable inlet guide vane is controlled (opened and closed) in a state close to normal temperature while keeping the engine rotation at a high level near its rated value so as to control (increase and decrease) the engine air flow rate and the fuel flow rate simultaneously, thus controlling the output.

Thus, an engine with high responsiveness and high reliability may be realized.

DETAILED DESCRIPTION OF THE PREFERRED EMBODIMENTS

Figure 1:
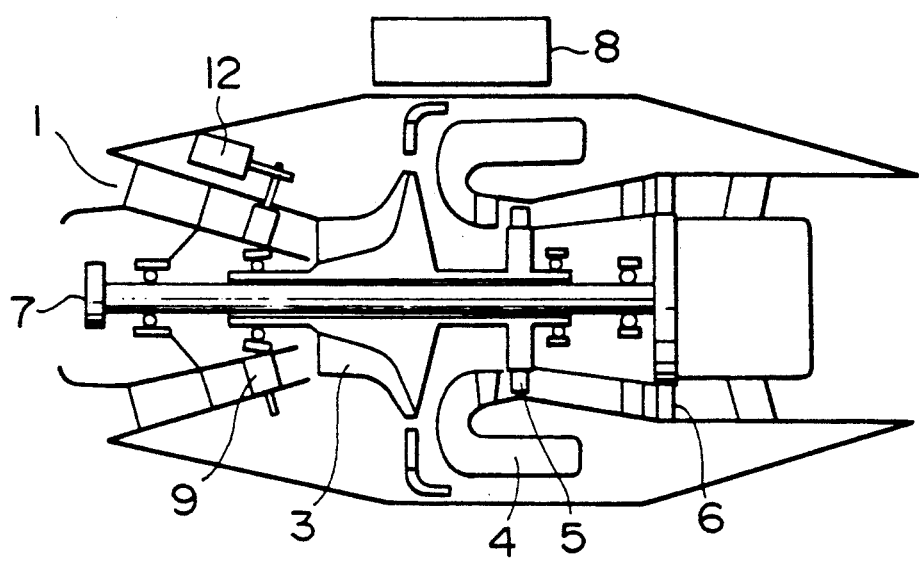
FIG. 1 is a longitudinal sectional view showing an embodiment in which the present invention is applied to a turboshaft engine for a helicopter.
Figure 2:
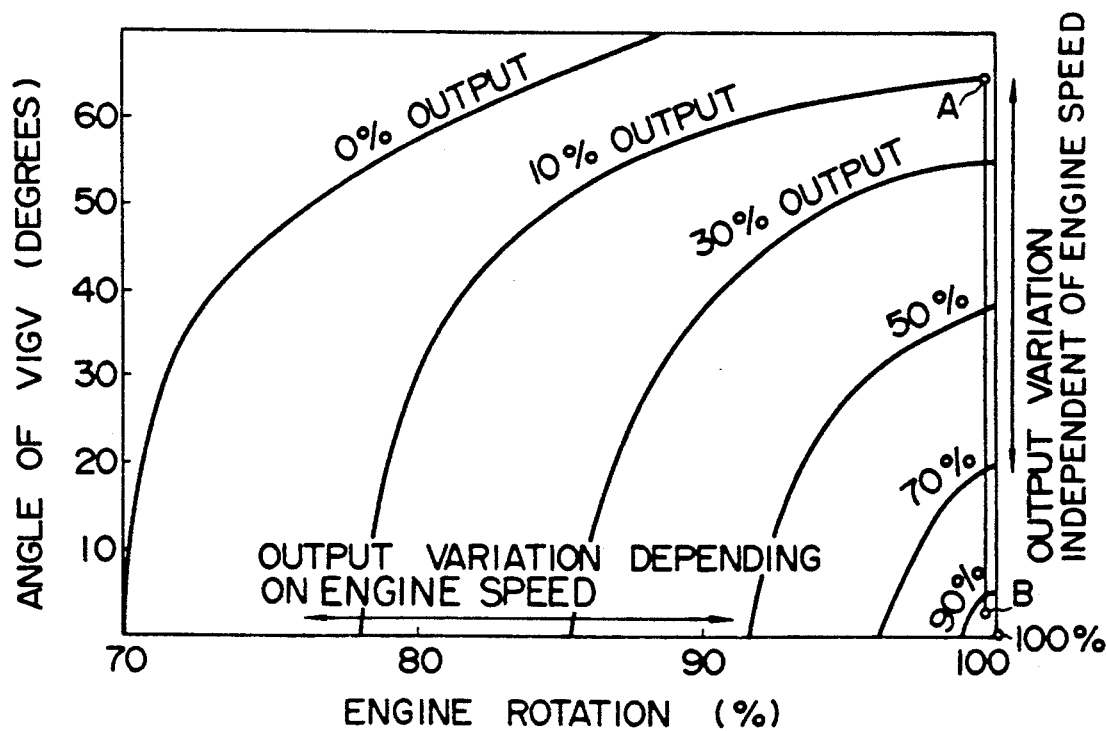
FIG. 2 is a diagram showing output response characteristics thereof.
Figure 5:
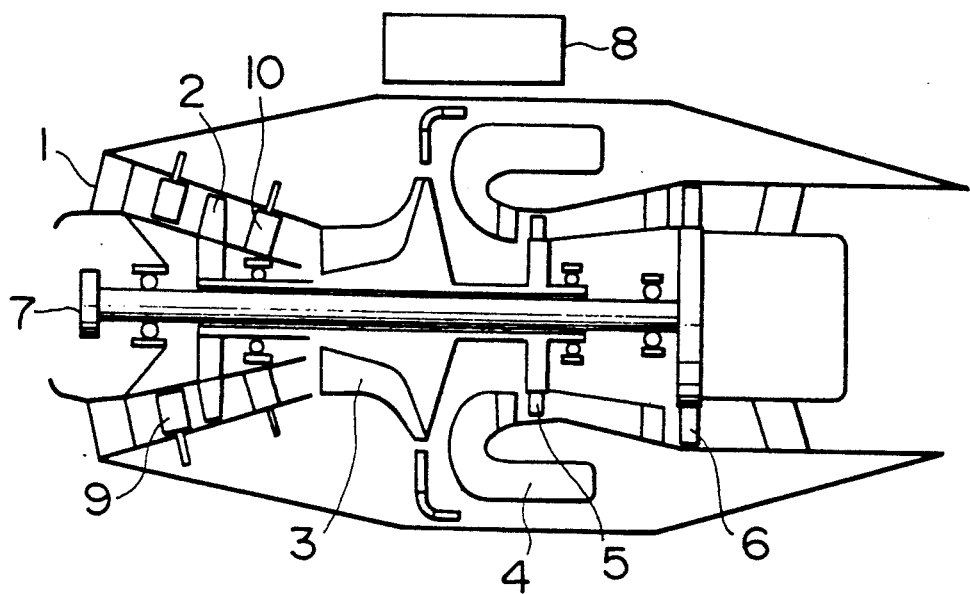
FIG. 5 and FIG. 6 are longitudinal sectional views showing examples of a conventional gas turbine engine.
Figure 6:
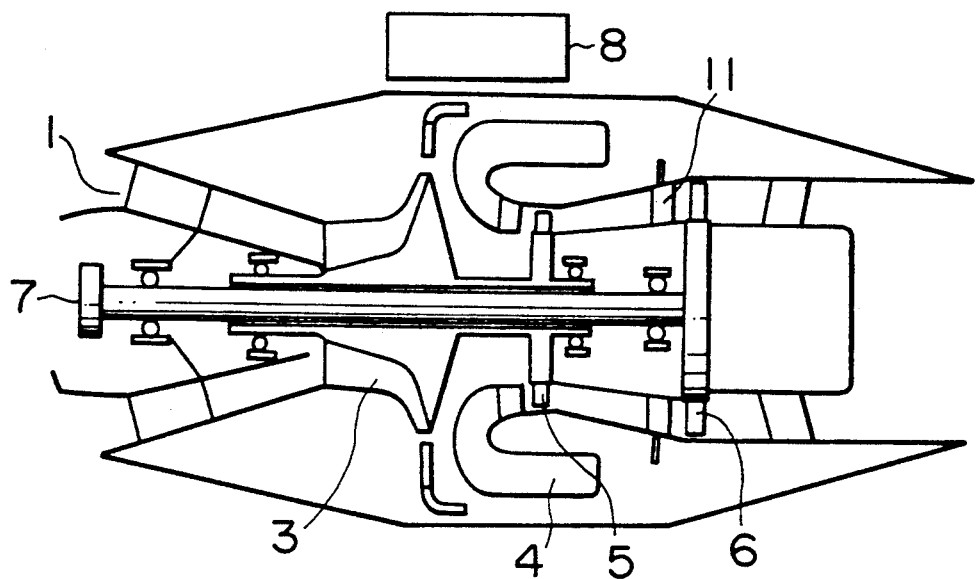

FIG. 1 is a longitudinal sectional view showing an embodiment in which the present invention is applied to a turboshaft engine for a helicopter, and FIG. 2 is a diagram showing output response characteristics thereof. In FIG. 1, same symbols are assigned to those parts that are similar to conventional ones described with reference to FIG. 5 and FIG. 6, and detailed description is omitted in order to avoid prolixity.

In the present embodiment, a variable inlet guide vane 9 is provided at an inlet of centrifugal compressor 3. A numeral 12 denotes an actuator for a variable inlet guide vane (VIGV).

In FIG. 1, it is possible to reduce the flow rate of air taken into an engine so as to lower engine brake horsepower even at high engine rotation by throttling (making an angle larger) the variable inlet guide vane 9 (point A in FIG. 2). The air flow rate is increased by opening the variable inlet guide vane 9 suddenly from this state, and the output also increases rapidly (point B in FIG. 2). Since the engine rotation is constant at this time, the output response time of the engine is determined almost by the response of the actuator for a variable inlet guide vane (VIGV). Thus, the output response time can be made to be very short. That is, output characteristics as shown in FIG. 2 are obtained in the present embodiment. It is understood that the brake horsepower can be varied in a very short period of time according to this Figure since the brake horsepower can be throttled to 10% or less while keeping the speed of engine rotation fixed at the rated value.

Besides, the output is increased and decreased by controlling also the fuel flow rate with the FADEC 8, simultaneously with the above-mentioned control of the air flow rate. The compressor needs to operate stably in order to perform the above-mentioned operation. In a conventional axial-flow compressor equipped with a variable inlet guide vane and a variable stationary vane or in a conventional compressor in which an axial-flow compressor and a centrifugal compressor are combined with each other, stable operation when the variable inlet guide vane is closed gradually has been difficult. Such stable operation, however, is possible in a compressor composed only of a single stage or a multistage centrifugal compressor as in the present embodiment.

Figure 3:
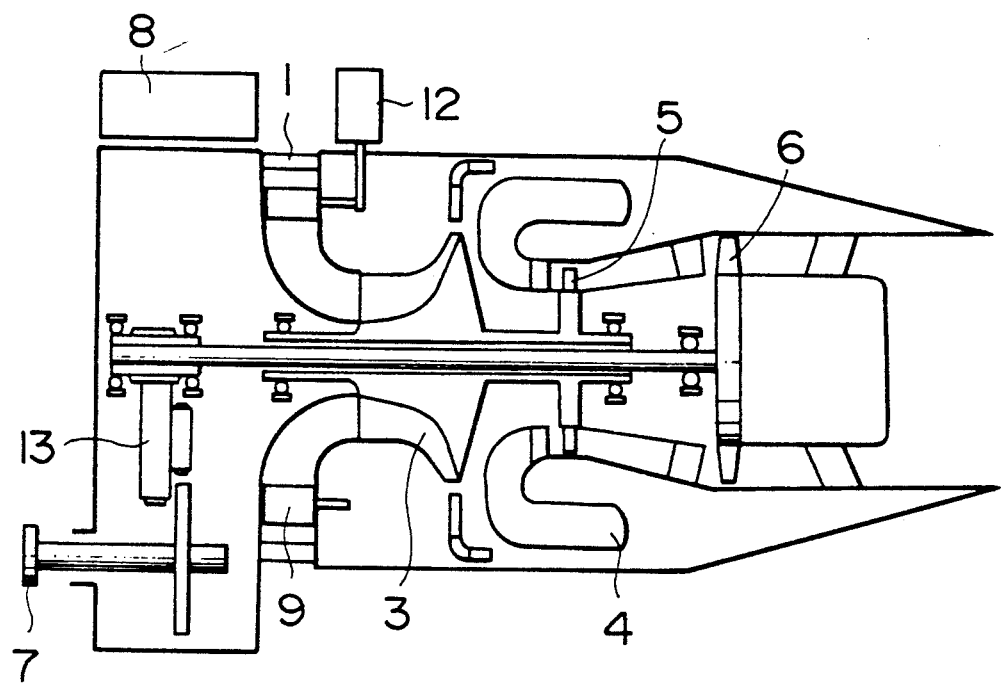
FIG. 3 is a longitudinal sectional view showing an example in which the present invention is applied to a turboprop engine for fixed wing aircraft as a second embodiment.

Next, FIG. 3 is a longitudinal sectional view showing an example in which the present invention is applied to a turboprop engine for fixed wing aircraft as a second embodiment. Same symbols are assigned in this Figure to those parts that are similar to what has been described above, and detailed description thereof is omitted.

A symbol 13 newly used in the present embodiment denotes a speed reducing gear box. In the present embodiment, similar operational effects as those in above-mentioned first embodiment are also obtainable.

Figure 4:
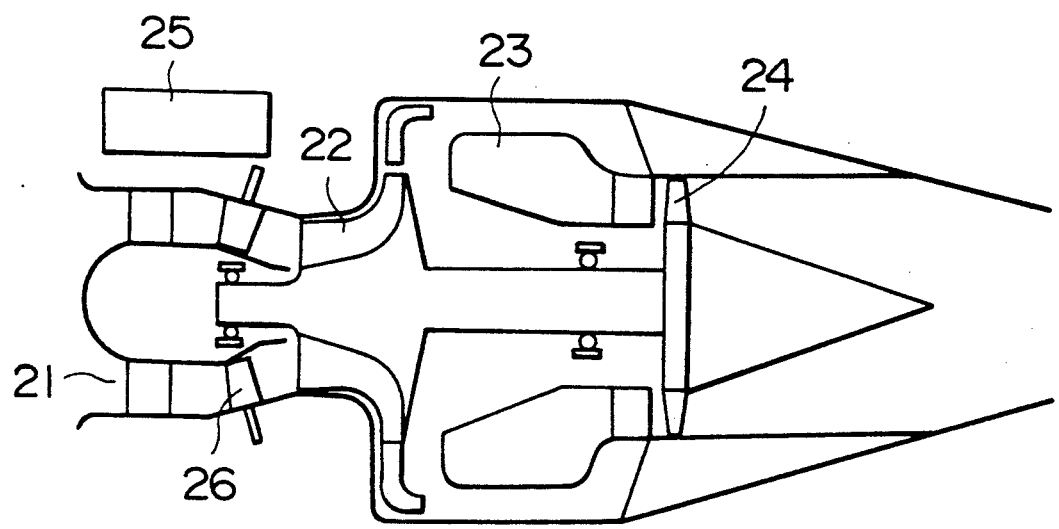
FIG. 4 is a schematic longitudinal sectional view showing a third embodiment of the present invention.

FIG. 4 is a schematic longitudinal sectional view showing a third embodiment of the present invention.

In FIG. 4, air suctioned through an air suction port 21 is pressurized by a centrifugal compressor 22 and led to a combustor 23, where the pressurized air is used for combustion of fuel. The combustion gas produced by combustion is led to a turbine 24. The turbine 24 is driven to rotate by a part of energy of the combustion gas. The remaining part of the energy of the combustion gas is used for the propulsion of aircraft or the like. The above-mentioned centrifugal compressor 22 is driven by the rotation of the turbine 24. A numeral 25 denotes a full authority digital electronic control (FADEC) device.

In the third embodiment, a variable inlet guide vane 26 is provided at the inlet of the centrifugal compressor 22. The variable inlet guide vane 26 is controlled by a controller (FADEC) 25 of the engine, and an angle of a variable inlet guide vane (viz. engine air flow rate) and the engine fuel flow rate are controlled at the same time. Since the variable inlet guide vane 26 and the variable mechanism of the present embodiment are arranged at the compressor inlet and operate in a state close to normal temperature, there is less fear of malfunction.

According to the present invention, following effects are obtainable.

1) It is possible to obtain a wide range of output at constant engine rotation.

2) Thus, it is possible to vary the output in a short period of time.

3) Fuel consumption may be improved depending on the magnitude of the output.

We claim:

1. A method of operating a gas turbine engine having a centrifugal compressor which is driven by a high-pressure turbine, and wherein sad centrifugal compressor is the only compressor of said engine, comprising the steps of:

positioning a variable inlet guide vane at an inlet air passage of said centrifugal compressor for adjusting the air flow rate through said engine; and changing the orientation of said guide vane while keeping the speed of rotation of said engine at a high level near its rated value to control the output of said engine by controlling the air flow rate through said engine.

2. A method of operating a thrust gas turbine engine having a centrifugal compressor for pressurizing air, a combustor for combustion of fuel using said pressurized air, a turbine which is driven to rotate by combustion of said fuel for rotating said compressor, and wherein said centrifugal compressor is the only compressor of said engine, comprising the steps of:

positioning a variable inlet guide vane at an inlet air passage of said centrifugal compressor for adjusting the air flow rate through said engine; and changing the orientation of said guide vane while keeping the speed of rotation of said engine at a high level near its rated value to control the output of said engine by simultaneously controlling both the fuel flow rate and the air flow rate through said engine.

3. The method of operating a gas turbine engine of claim 1, wherein said gas turbine is of a brake horsepower type.

4. The method of operating a gas turbine engine of claim 2, wherein said gas turbine is of a brake horsepower type.

* * * * *